US012686421B2

(12) United States Patent
Yamanouchi et al.

(10) Patent No.: US 12,686,421 B2
(45) Date of Patent: Jul. 21, 2026

(54) OBSTACLE MONITORING SYSTEM, OBSTACLE MONITORING APPARATUS, OBSTACLE MONITORING METHOD

(71) Applicant: NEC Corporation, Tokyo (JP)

(72) Inventors: Shingo Yamanouchi, Tokyo (JP); Toshiyuki Nomura, Tokyo (JP); Junichi Abe, Tokyo (JP); Hidemi Noguchi, Tokyo (JP); Yoshimasa Ono, Tokyo (JP); Tatsuya Fujimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/820,903

(22) Filed: Aug. 30, 2024

(65) Prior Publication Data

US 2025/0091623 A1 Mar. 20, 2025

(30) Foreign Application Priority Data

Sep. 15, 2023 (JP) ................................ 2023-149921

(51) Int. Cl.
| | |
|---|---|
| *B61L 15/00* | (2006.01) |
| *B61L 23/04* | (2006.01) |
| *G06V 10/82* | (2022.01) |
| *G06V 20/56* | (2022.01) |

(52) U.S. Cl.
CPC ......... *B61L 15/0062* (2024.01); *B61L 23/041* (2013.01); *G06V 10/82* (2022.01); *G06V 20/56* (2022.01)

(58) Field of Classification Search
CPC ... B61L 15/0062; B61L 23/041; G06V 10/82; G06V 20/56; G06V 20/58
See application file for complete search history.

(56) References Cited

U.S. PATENT DOCUMENTS

| | | | |
|---|---|---|---|
| 6,163,755 A * | 12/2000 | Peer ...................... | B61L 23/044 |
| | | | 701/19 |
| 7,999,848 B2 * | 8/2011 | Chew .................... | B61L 23/041 |
| | | | 348/148 |
| 8,229,170 B2 * | 7/2012 | Sebastian .............. | B61L 23/041 |
| | | | 382/104 |
| 2017/0016758 A1 * | 1/2017 | Salzgeber ............. | B61L 23/041 |
| 2018/0186391 A1 * | 7/2018 | Gariepy ............... | G05D 1/0066 |

FOREIGN PATENT DOCUMENTS

WO        2018/179958 A1       10/2018

* cited by examiner

*Primary Examiner* — George C Jin

(57) ABSTRACT

An obstacle monitoring system includes: a sensing means; a first obstacle detection means; and a control means for selectively executing a plurality of control modes including a first control mode in which a moving speed of a moving body is a first moving speed and a sensing field of view of the sensing means is a first field of view, and a second control mode in which a moving speed of the moving body is a second moving speed and a sensing field of view of the sensing means is a second field of view. When the first obstacle detection means detects the obstacle while the control means is executing the first control mode, the control means executes the second control mode in such a way as to capture the obstacle within the second field of view.

10 Claims, 6 Drawing Sheets

| | | HARMFUL CLASS GROUP | | | | | HARMLESS CLASS GROUP | | | | |
|---|---|---|---|---|---|---|---|---|---|---|---|
| | | CLASS A1 | CLASS A2 | CLASS A3 | CLASS A4 | CLASS A5 | CLASS B1 | CLASS B2 | CLASS B3 | CLASS B4 | CLASS B5 |
| GOOD WEATHER | CURVED LINE | 0.60 | 0.64 | 0.67 | 0.60 | 0.40 | 0.81 | 0.77 | 0.72 | 0.72 | 0.83 |
| | STRAIGHT LINE | 0.70 | 0.74 | 0.77 | 0.70 | 0.50 | 0.91 | 0.87 | 0.82 | 0.82 | 0.93 |
| BAD WEATHER | CURVED LINE | 0.40 | 0.44 | 0.47 | 0.40 | 0.20 | 0.61 | 0.57 | 0.52 | 0.52 | 0.63 |
| | STRAIGHT LINE | 0.50 | 0.54 | 0.57 | 0.50 | 0.30 | 0.71 | 0.67 | 0.62 | 0.62 | 0.73 |

Fig. 4

OBSTACLE MONITORING SYSTEM, OBSTACLE MONITORING APPARATUS, OBSTACLE MONITORING METHOD

INCORPORATION BY REFERENCE

This application is based upon and claims the benefit of priority from Japanese patent application No. 2023-149921, filed on Sep. 15, 2023, the disclosure of which is incorporated herein in its entirety by reference.

TECHNICAL FIELD

The present disclosure relates to an obstacle monitoring system, an obstacle monitoring apparatus, an obstacle monitoring method, and a non-transitory computer readable medium.

BACKGROUND ART

International Patent Publication No. 2018/179958 discloses a vehicle control system that, upon detection of an obstacle ahead of a vehicle, searches for a retreat space for the vehicle, guides the vehicle to the searched retreat space, and stops the vehicle. A stereo-camera, a radio detection and ranging (Radar) apparatus, and a light detection and ranging (LiDAR) apparatus are exemplified as a means for detecting an obstacle ahead of the vehicle.

SUMMARY

Meanwhile, in a case of detecting an obstacle in a heading direction of a moving body, based on a sensing result of a sensing means mounted on the moving body, a moving speed of the moving body and detection accuracy for the obstacle have a trade-off relationship, and it is difficult to achieve both high moving speed and high accuracy at the same time.

Specifically, in a case where the moving body is moved at a high speed, a time period from when the moving body detects the obstacle until when the moving body actually collides with the obstacle is limited. Therefore, there is insufficient time for detecting the obstacle with high accuracy. As a result, the obstacle may be erroneously detected. When the moving speed of the moving body is reduced due to erroneously detecting the obstacle, a time at which the moving body arrives at a destination is delayed.

An example object of the present disclosure is to provide a technique for improving detection accuracy for an obstacle while securing a moving speed of a moving body when detecting an obstacle in a heading direction of the moving body, based on a sensing result of a sensing means mounted on the moving body.

In a first example aspect, an obstacle monitoring system includes:

a sensing unit configured to perform sensing of an area ahead in a moving direction of a moving body;

a first obstacle detection unit configured to detect an obstacle, based on a sensing result of the sensing unit; and a control unit configured to selectively execute a plurality of control modes including a first control mode in which a moving speed of the moving body is a first moving speed and a sensing field of view of the sensing unit is a first field of view, and a second control mode in which a moving speed of the moving body is a second moving speed being lower than the first moving speed and a sensing field of view of the sensing unit is a second field of view being narrower than the first field of view, wherein, when the first obstacle detection unit detects the obstacle while the control unit is executing the first control mode, the control unit executes the second control mode in such a way as to capture the obstacle within the second field of view.

In a second example aspect, an obstacle monitoring apparatus includes:

a sensing unit configured to perform sensing of an area ahead in a moving direction of a moving body;

a first obstacle detection unit configured to detect an obstacle, based on a sensing result of the sensing unit; and a control unit configured to selectively execute a plurality of control modes including a first control mode in which a moving speed of the moving body is a first moving speed and a sensing field of view of the sensing unit is a first field of view, and a second control mode in which a moving speed of the moving body is a second moving speed being lower than the first moving speed and a sensing field of view of the sensing unit is a second field of view being narrower than the first field of view, wherein, when the first obstacle detection unit detects the obstacle while the control unit is executing the first control mode, the control unit executes the second control mode in such a way as to capture the obstacle within the second field of view.

In a third example aspect, an obstacle monitoring method includes, by a computer:

detecting an obstacle, based on a sensing result of a sensing unit configured to perform sensing of an area ahead in a moving direction of a moving body;

selectively executing a plurality of control modes including a first control mode in which a moving speed of the moving body is a first moving speed and a sensing field of view of the sensing unit is a first field of view, and a second control mode in which a moving speed of the moving body is a second moving speed being lower than the first moving speed and a sensing field of view of the sensing unit is a second field of view being narrower than the first field of view; and executing the second control mode in such a way as to capture the obstacle within the second field of view, when detecting the obstacle while executing the first control mode.

BRIEF DESCRIPTION OF DRAWINGS

The above and other aspects, features, and advantages of the present disclosure will become more apparent from the following description of certain example embodiments when taken in conjunction with the accompanying drawings, in which:

FIG. 4 is an explanatory diagram of a threshold value table;

EXAMPLE EMBODIMENT

Outline of the Present Disclosure

Figure 1:
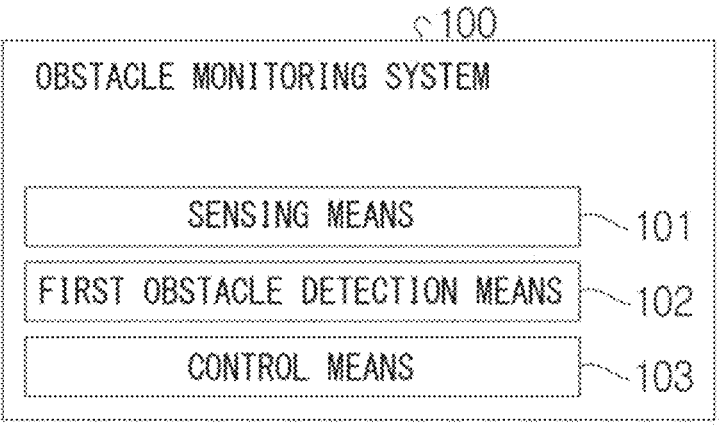
FIG. 1 is a block diagram of an obstacle monitoring system.

Hereinafter, an outline of the present disclosure is described. FIG. 1 is a block diagram illustrating an obstacle monitoring system 100. As illustrated in FIG. 1, the obstacle monitoring system 100 includes a sensing means 101, a first obstacle detection means 102, and a control means 103.

The sensing means 101 performs sensing of an area ahead in a moving direction of a moving body.

The first obstacle detection means 102 detects an obstacle, based on a sensing result of the sensing means 101.

The control means 103 selectively executes a plurality of control modes including a first control mode and a second control mode.

The first control mode is a control mode in which the moving speed of the moving body is a first moving speed and a sensing field of view of the sensing means is a first field of view.

The second control mode is a control mode in which the moving speed of the moving body is a second moving speed being lower than the first moving speed, and the sensing field of view of the sensing means is a second field of view being narrower than the first field of view.

When the first obstacle detection means 102 has detected an obstacle while the control means 103 is executing the first control mode, the control means 103 executes the second control mode in such a way as to capture the obstacle within the second field of view.

According to the above-described configuration, when detecting the obstacle in the heading direction of the moving body, based on the sensing result of the sensor mounted on the moving body, it is possible to improve the detection accuracy for the obstacle while securing the moving speed of the moving body.

EXAMPLE EMBODIMENTS

Figure 2:
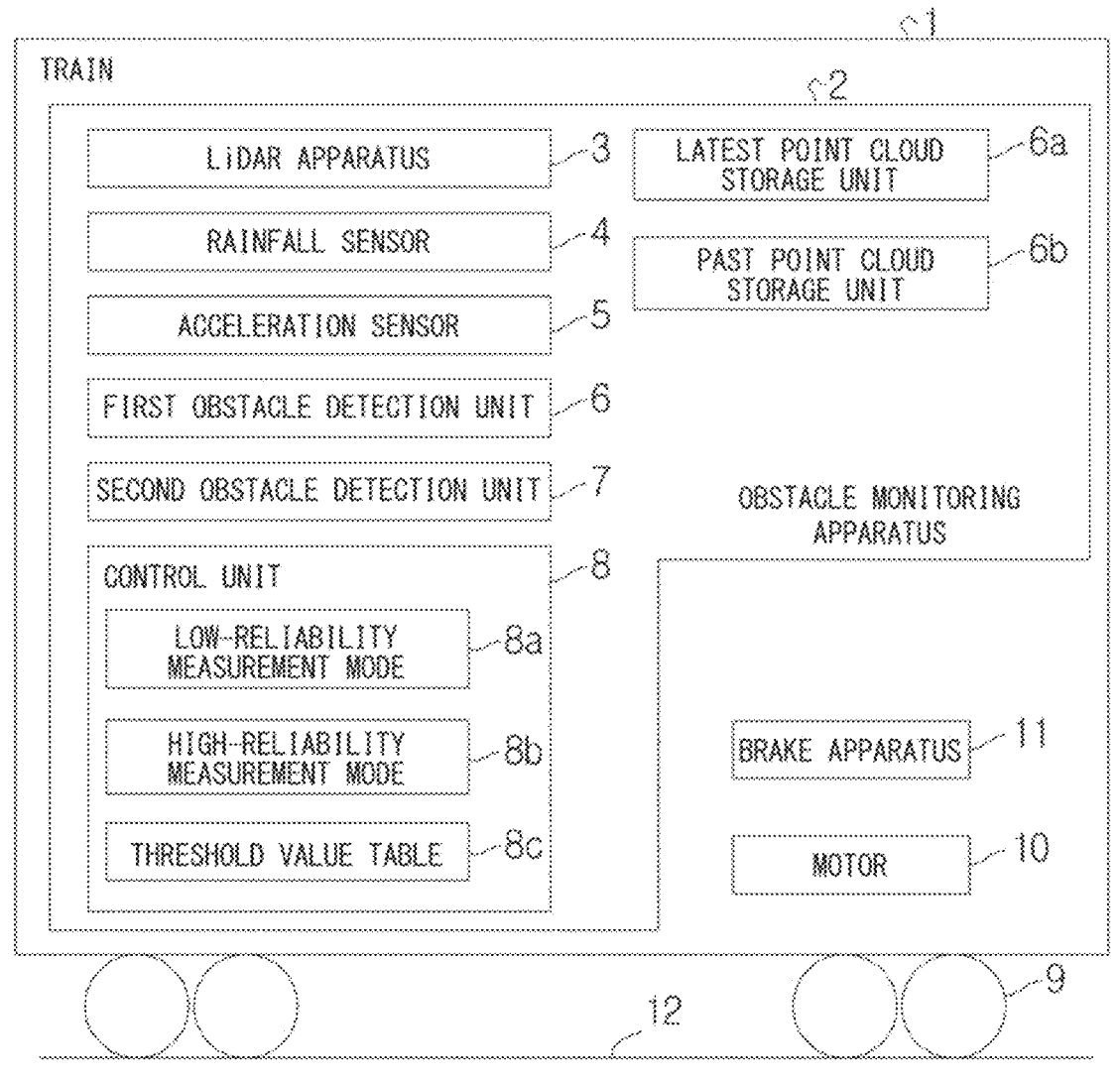
FIG. 2 is a block diagram of an obstacle monitoring apparatus.

Hereinafter, an example embodiment of the present disclosure is described. FIG. 2 is a block diagram illustrating an obstacle monitoring apparatus 2 mounted on a train 1.

As illustrated in FIG. 2, the obstacle monitoring apparatus 2 includes a LiDAR apparatus 3, a rainfall sensor 4, an acceleration sensor 5, a first obstacle detection unit 6, a second obstacle detection unit 7, and a control unit 8. In addition to the obstacle monitoring apparatus 2, the train 1 further includes a motor 10 for driving wheels 9 and a brake apparatus 11 for braking the wheels 9. The train 1 travels along a rail 12. The rail 12 is a specific example of a movement track on which the train 1 travels. The train 1 is a specific example of the moving body. The moving body is not limited to the train 1, and may be an automobile or a drone.

The LiDAR apparatus 3 is a specific example of a sensing means for performing sensing of an area ahead in the traveling direction of the train 1. The LiDAR apparatus 3 according to the present example embodiment is a direct time of flight (ToF) type. That is, the LiDAR apparatus 3 generates a three-dimensional point cloud ahead in the traveling direction of the train 1 by emitting a laser beam forward in the traveling direction of the train 1 and measuring a time required for receiving a reflected light thereof. However, instead of this, the LiDAR apparatus 3 may be a frequency modulated continuous wave (FMCW) type that generates the three-dimensional point cloud, based on the frequency difference between the laser beam emitted forward in the traveling direction of the train 1 and the reflected light thereof. Further, the LiDAR apparatus 3 may be an indirect ToF type that generates the three-dimensional point cloud, based on a phase difference between the laser beam emitted forward in the traveling direction of the train 1 and the reflected light thereof. The LiDAR apparatus 3 corrects the generated three-dimensional point cloud by using the current position of the train 1 that changes from moment to moment. The LiDAR apparatus 3 stores the corrected three-dimensional point cloud represented by a global coordinate system in a latest point cloud storage unit 3a.

Note that the sensing means is not limited to the LiDAR apparatus 3. As the sensing means, any apparatus can be adopted as long as it can perform sensing of an area ahead in the traveling direction of the train 1. For example, the sensing means may be configured to generate a three-dimensional point cloud by a radio detection and ranging (Radar) apparatus, an ultrasonic sensor, a stereo-camera, or combinations thereof. In addition, the sensing means may be configured to generate a three-dimensional point cloud by structure from motion (SfM) from a plurality of two-dimensional images acquired by imaging an area ahead in the traveling direction of the train 1. In any of the sensing means, there is a feature that the longer the measurement time can be achieved, the higher the reliability of the sensing result becomes.

The rainfall sensor 4 is a weather sensor for detecting whether the current weather is rainy or fine. The rainfall sensor 4 outputs the sensing result to the control unit 8.

The acceleration sensor 5 detects acceleration acting on the train 1. The acceleration sensor 5 outputs the sensing result to the control unit 8.

The first obstacle detection unit 6 detects an obstacle ahead in the traveling direction of the train 1, based on the three-dimensional point cloud stored in the latest point cloud storage unit 3a. Typically, the first obstacle detection unit 6 compares the three-dimensional point cloud stored in the latest point cloud storage unit 3a with the three-dimensional point cloud stored in a past point cloud storage unit 3b, and detects an obstacle ahead in the traveling direction of the train 1, based on the calculated difference. The three-dimensional point cloud stored in the past point cloud storage unit 3b is a three-dimensional point cloud generated and accumulated in the past, before the time point at which the train 1 travels. The obstacle is, for example, a person, an animal, a stone placed on a rail or the like, or a fallen tree.

The second obstacle detection unit 7 is configured by a trained neural network that receives the three-dimensional point cloud stored in the latest point cloud storage unit 3a and outputs a detection score for each class of the obstacle detected by the first obstacle detection unit 6. The detection score for each class of the obstacle detected by the first obstacle detection unit 6 is output to an output layer of the trained neural network. The detection score indicates a probability of belonging to a relevant class of a relevant obstacle. In the present example embodiment, the probability is expressed in a range of 0 to 1. The detection score of each class is normalized by a softmax function in such a way that the sum of the detection scores of all the classes becomes 1.

The control unit 8 selectively executes a plurality of measurement modes including a low-reliability measurement mode 8a and a high-reliability measurement mode 8b. The measurement mode is a specific example of the control mode. The low-reliability measurement mode 8a is a specific example of the first control mode. The high-reliability measurement mode 8b is a specific example of the second control mode. In the present example embodiment, the plurality of measurement modes include the low-reliability measurement mode 8a and the high-reliability measurement mode 8b. The plurality of measurement modes may include other measurement modes, such as, for example, a medium-reliability measurement mode.

Figure 3:
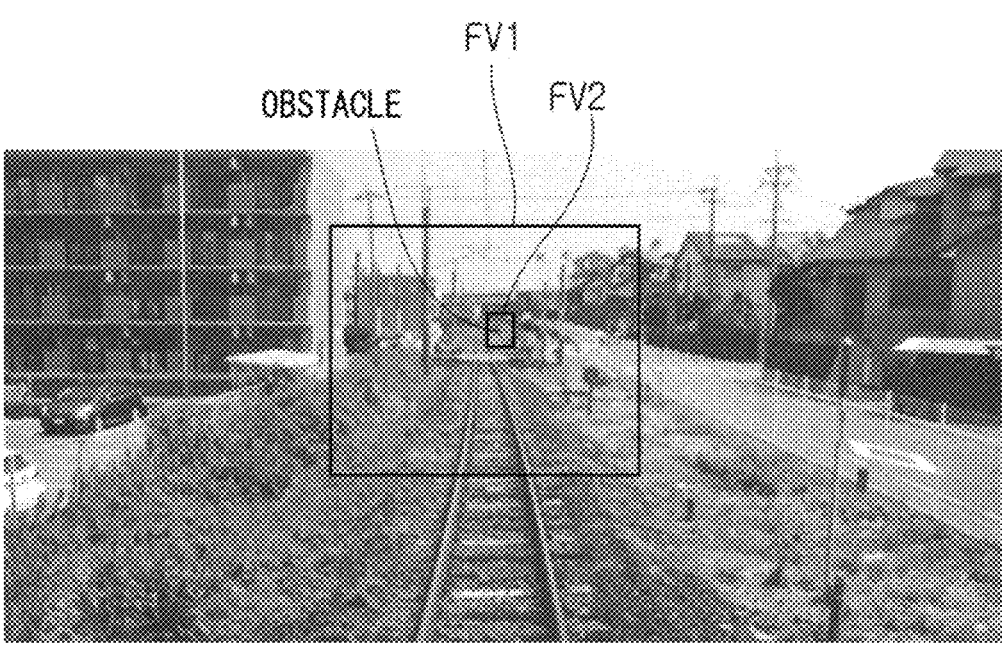
FIG. 3 is an explanatory diagram of a field of view.

The low-reliability measurement mode 8a is a measurement mode in which the traveling speed of the train 1 is a first traveling speed and the sensing field of view (FoV) of the LiDAR apparatus 3 is a first field of view. The high-reliability measurement mode 8b is a measurement mode in which the traveling speed of the train 1 is a second traveling speed being lower than the first traveling speed and the sensing field of view of the LiDAR apparatus 3 is a second field of view being narrower than the first field of view. FIG. 3 illustrates a first field of view FV1 when the control unit 8 executes the low-reliability measurement mode 8a and a second field of view FV2 when the control unit 8 executes the high-reliability measurement mode 8b. As illustrated in FIG. 3, the second field of view FV2 is a field of view inside the first field of view FV1. The first field of view FV1 includes the second field of view FV2.

When the first obstacle detection unit 6 has detected an obstacle while the control unit 8 is executing the low-reliability measurement mode 8a, the control unit 8 executes the high-reliability measurement mode 8b so as to capture the obstacle within the second field of view FV2. That is, when the control unit 8 executes the high-reliability measurement mode 8b, the LiDAR apparatus 3 intensively scans the obstacle detected by the first obstacle detection unit 6. Accordingly, the LiDAR apparatus 3 can increase the point cloud density of the three-dimensional point cloud relating to the obstacle detected by the first obstacle detection unit 6. In addition, when the control unit 8 executes the high-reliability measurement mode 8b, since the traveling speed of the train 1 is the second traveling speed, it is possible to take a long time for the LiDAR apparatus 3 to scan the obstacle detected by the first obstacle detection unit 6. In this sense as well, the LiDAR apparatus 3 can increase the point cloud density of the three-dimensional point cloud relating to the obstacle detected by the first obstacle detection unit 6.

Referring back to FIG. 2, the control unit 8 includes a threshold value table 8c. The control unit 8 refers to the threshold value table 8c when controlling the traveling of the train 1 depending on the type of obstacle, the weather condition, and the shape of the rail 12.

FIG. 4 illustrates numerical values on the threshold value table 8c. As illustrated in FIG. 4, the threshold value table 8c defines a score threshold value for each class. The plurality of classes (types and categories) are roughly grouped into a harmful class group 20 in which traveling of the train 1 is hindered and a harmless class group 21 in which traveling of the train 1 is not hindered. Classes A1 to A5 belong to the harmful class group 20. Classes B1 to B5 belong to the harmless class group 21. Classes A1 to A5 are, for example, a person, a stone placed on a rail or the like, or a fallen tree. Classes B1 to B5 are, for example, an animal. The score threshold value of each class belonging to the harmless class group 21 is set higher than the score threshold value of each class belonging to the harmful class group 20.

The score threshold values of the classes are set in more detail according to the weather conditions and the shape of the rail 12. That is, for example, focusing on the score threshold value of class A1, the score threshold value of class A1 is set as follows.

The score threshold value is set to 0.60 in a case where the weather is good and the rail 12 is curved.

The score threshold value is set to 0.70 in a case where the weather is good and the rail 12 is straight.

The score threshold value is set to 0.40 in a case where the weather is bad and the rail 12 is curved.

The score threshold value is set to 0.50 in a case where the weather is bad and the rail 12 is straight.

Then, when the detection score exceeds the score threshold value in any of the classes, the control unit 8 decelerates or stops the train 1.

As described above, the score threshold value in the case of a bad weather is set to be lower than the score threshold value in the case of a good weather. In the example of FIG. 4, the score threshold value in the case of a bad weather is set to be 0.2 points lower than the score threshold value in the case of a good weather. That is, there is a problem that the number of points in the three-dimensional point cloud that can be generated by the LiDAR apparatus 3 per unit time decreases in the case of a bad weather. In other words, the reliability of the sensing by the LiDAR apparatus 3 decreases in the case of a bad weather. Therefore, since it is considered that the reliability of the detection score output from the second obstacle detection unit 7 is decreased in the case of a bad weather, prevention of collision between the train 1 and the obstacle is prioritized, that is, it is easier to decelerate or stop the train 1, as compared with the case of a good weather.

Further, the score threshold value in the case where the rail 12 on which the train 1 is currently traveling is curved is set to be lower than the score threshold value in the case where the rail 12 on which the train 1 is currently traveling is straight. In the example of FIG. 4, the score threshold value in the case where the rail 12 on which the train 1 is currently traveling is curved is set to be 0.1 point lower than the score threshold value in the case where the rail 12 on which the train 1 is currently traveling is straight. That is, in the case where the rail 12 on which the train 1 is currently traveling is curved, it is difficult to perform tracking of the rail 12, and it is conceivable that the reliability of the detection score output from the second obstacle detection unit 7 decreases. Therefore, in the case where the rail 12 on which the train 1 is currently traveling is curved, prevention of collision between the train 1 and the obstacle is prioritized, that is, it is easier to decelerate or stop the train 1, as compared with the case where the rail 12 on which the train 1 is currently traveling is straight.

In addition, when the detection scores of classes A1 to A5 belonging to the harmful class group 20 are slightly higher, that is, when the possibility that the obstacle detected by the first obstacle detection unit 6 is classified into a class that hinders the traveling of the train 1 increases even slightly, the control unit 8 rapidly decelerates or stops the train 1. Meanwhile, when the detection scores of the classes B1 to B5 belonging to the harmless class group 21 are high, that is, when the possibility that the obstacle detected by the first obstacle detection unit 6 is classified into a class that does not hinder the travel of the train 1 increases, the control unit 8 does not decelerate the train 1 or stop the train 1 in order to prioritize the travel of the train 1. Thus, it is possible to maintain the regular operation of the train 1 as much as possible while preventing the collision between the train 1 and the obstacle.

In the present example embodiment, the control unit 8 determines the weather at a location where the train 1 is currently traveling, based on the sensing result of the rainfall sensor 4. Additionally or alternatively, the control unit 8 may determine the weather at the location where the train 1 is currently traveling by accessing an external server that provides weather information.

Further, in the present example embodiment, the control unit 8 determines whether the rail 12 on which the train 1 is currently traveling is curved or straight, based on the sensing result of the acceleration sensor 5. Additionally or alternatively, the control unit 8 may determine whether the rail 12 on which the train 1 is currently traveling is curved or straight, based on current position information indicating the current position of the train 1 and map information including the track of the rail 12.

Further, in the present example embodiment, the control unit 8 controls the traveling speed of the train 1 by outputting a drive command to a motor driver (not illustrated) that drives the motor 10 or by outputting a drive command to a brake driver (not illustrated) that drives the brake apparatus 11.

Figure 5:
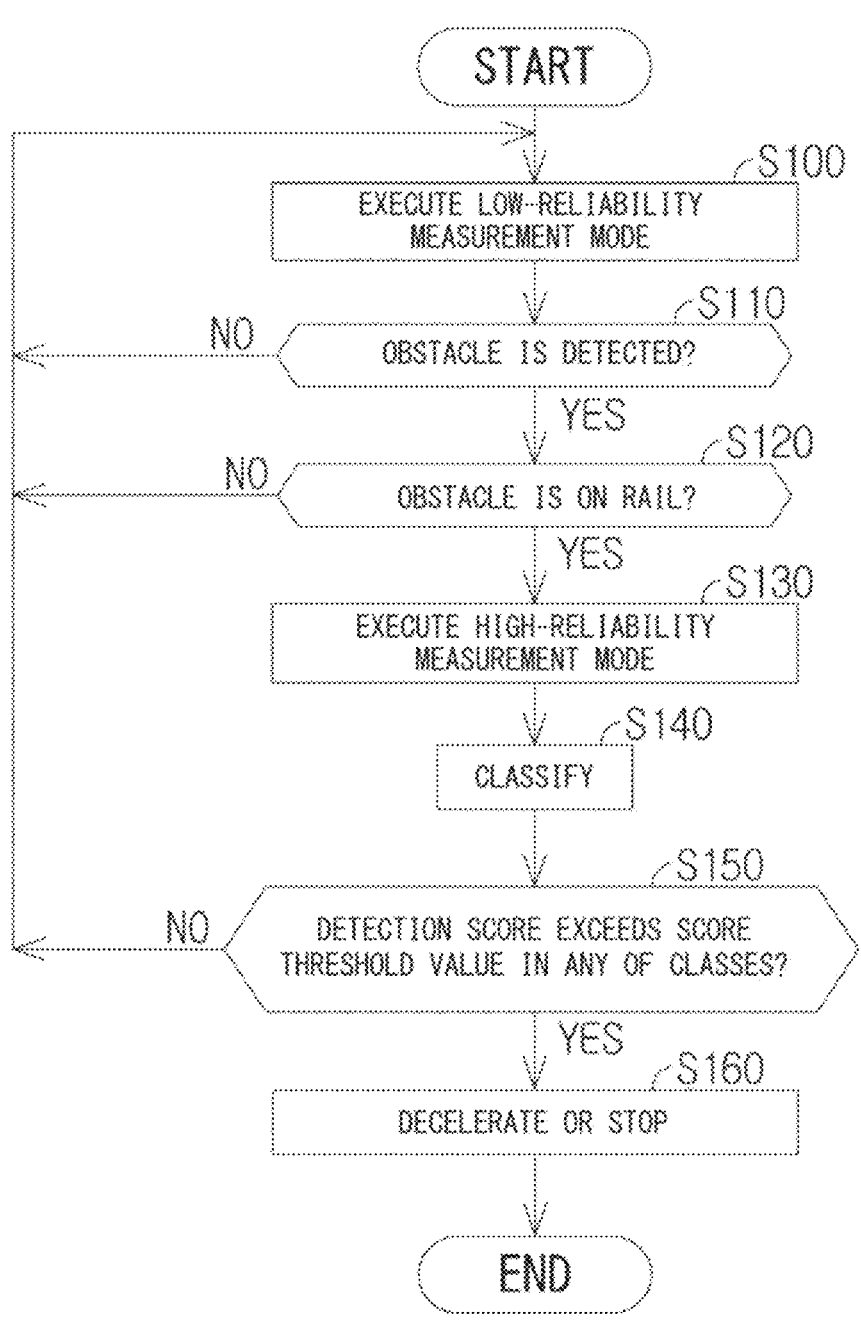
FIG. 5 is a control flow of the obstacle monitoring apparatus.

Next, an operation flow of the obstacle monitoring apparatus 2 is described. FIG. 5 illustrates a control flow of the obstacle monitoring apparatus 2.

S100

First, the control unit 8 executes the low-reliability measurement mode 8a.

S110

Next, the control unit 8 determines whether the first obstacle detection unit 6 has detected an obstacle. In a case where the first obstacle detection unit 6 has detected an obstacle (S110: YES), the control unit 8 advances the process to S120. Meanwhile, in a case where the first obstacle detection unit 6 has not detected an obstacle (S110: NO), the control unit 8 returns the process to S100.

S120

Next, the control unit 8 determines whether the obstacle detected by the first obstacle detection unit 6 is on the rail 12. In a case where the obstacle detected by the first obstacle detection unit 6 is outside the rail 12 (S120: NO), the control unit 8 returns the process to S100. Meanwhile, in a case where the obstacle detected by the first obstacle detection unit 6 is on the rail 12 (S120: YES), the control unit 8 advances the process to S130.

S130

Next, the control unit 8 executes the high-reliability measurement mode 8b instead of the low-reliability measurement mode 8a. Accordingly, the train 1 decelerates and the LiDAR apparatus 3 intensively scans the obstacle detected by the first obstacle detection unit 6.

S140

Next, the second obstacle detection unit 7 executes classification of the obstacle detected by the first obstacle detection unit 6, based on the three-dimensional point cloud stored in the latest point cloud storage unit 3a.

S150

Next, the control unit 8 determines the current weather and the shape of the rail 12, based on the sensing results of the rainfall sensor 4 and the acceleration sensor 5. Then, the control unit 8 refers to the threshold value table 8c to determine whether the detection score exceeds the score threshold value in any of the classes. In a case where it is determined that the detection score exceeds the score threshold value in any of the classes (S150: YES), the control unit 8 advances the process to S160. Meanwhile, in a case where it is determined that the detection score does not exceed the score threshold value in any of the classes (S150: NO), the control unit 8 returns the process to S100.

For example, in a case where the detection score, which is the probability that the obstacle detected by the first obstacle detection unit 6 is classified into class A2, is 0.6, the current weather is a bad weather, and the rail 12 on which the train 1 is currently traveling is straight, the detection score exceeds the score threshold value 0.54. In such a case, the control unit 8 advances the process from S150 to S160.

Further, in a case where the detection score, which is the probability that the obstacle detected by the first obstacle detection unit 6 is classified into class B4, is 0.7, the current weather is a good weather, and the rail 12 on which the train 1 is currently traveling is curved, the detection score is lower than the score threshold value 0.72. In such a case, the control unit 8 returns the process from S150 to S100.

S160

Next, the control unit 8 decelerates or stops the train 1 and ends the process. Accordingly, collision between the train 1 and the obstacle can be mitigated or avoided.

A preferred example embodiment according to the present disclosure has been described above. The above-described example embodiment has the following features.

The obstacle monitoring apparatus 2 is a specific example of an obstacle monitoring system. The obstacle monitoring apparatus 2 includes the LiDAR apparatus 3 (sensing means), the first obstacle detection unit 6 (first obstacle detection means), and the control unit 8 (control means). The LiDAR apparatus 3 perform sensing of an area ahead in the traveling direction (moving direction) of the train 1 (moving body). The first obstacle detection unit 6 detects an obstacle, based on a sensing result of the LiDAR apparatus 3. The control unit 8 selectively executes a plurality of measurement modes (control modes) including the low-reliability measurement mode 8a (first control mode) and the high-reliability measurement mode 8b (second control mode). When the first obstacle detection unit 6 has detected an obstacle while the control unit 8 is executing the low-reliability measurement mode 8a, the control unit 8 executes the high-reliability measurement mode 8b so as to capture the obstacle within the second field of view FV2. According to the above-described configuration, the detection accuracy for an obstacle can be improved while securing the moving speed of the train 1, when detecting an obstacle in the traveling direction of the train 1, based on the sensing result of the LiDAR apparatus 3 mounted on the train 1.

The obstacle monitoring apparatus 2 further includes the second obstacle detection unit 7 (second obstacle detection means). The second obstacle detection unit 7 is configured by a trained neural network that inputs a sensing result of the LiDAR apparatus 3 and outputs a detection score for each class of the obstacle detected by the first obstacle detection unit 6 when the control unit 8 is executing the high-reliability measurement mode 8b. According to the above-described configuration, it is possible to achieve high reliability in classifying obstacles. Note that, PointNet, PointNet++, or VoteNet may be adopted as the trained neural network for performing classification based on the three-dimensional point cloud. Further, the reliability of object detection may be improved by performing sensor fusion on a two-dimensional image and a three-dimensional point cloud.

Further, as illustrated in FIG. 4, in the threshold value table 8c, a score threshold value is set for each class. The control unit 8 decelerates or stops the train 1 when the detection score exceeds the score threshold value in any of the classes. According to the above-described configuration, it is possible to adjust in detail the travel control of the train 1, whether to prioritize the operation of the train 1 for each class, or prioritize the avoidance of collision between the train 1 and the obstacle.

In addition, the first score threshold value is set as a score threshold value for a class in which traveling of the train 1 is hindered. The second score threshold value being higher than the first score threshold value is set as the score threshold value for a class in which the traveling of the train 1 is not hindered. According to the above-described configuration, it is possible to adjust in detail the travel control of the train 1, according to the presence or absence of hindrance in the travel of the train 1, whether to prioritize the operation of the train 1 or prioritize the avoidance of collision between the train 1 and the obstacle.

Further, in each class, the score threshold value in the case of a bad weather is set lower than the score threshold value in the case of a good weather. According to the above-described configuration, since the train 1 is easily decelerated or stopped in the case of a bad weather, collision prevention between the train 1 and an obstacle is prioritized.

Further, in each class, the score threshold value in the case where the rail 12 (movement track) on which the train 1 is currently moving is curved is set lower than the score threshold value in the case where the rail 12 is straight. According to the above-described configuration, since the train 1 is easily decelerated or stopped in the case where the rail 12 is curved, collision prevention between the train 1 and an obstacle is prioritized.

When the obstacle detected by the first obstacle detection unit 6 is outside the rail 12 of the train 1 (S120: NO), the control unit 8 does not switch the control mode. According to the above-described configuration, since the train 1 is not unnecessarily decelerated, it is possible to prioritize the regular operation of the train 1.

Next, a hardware configuration of the obstacle monitoring apparatus 2 is described. In the obstacle monitoring apparatus 2, the first obstacle detection unit 6, the second obstacle detection unit 7, and the control unit 8 are implemented by a processing circuit. The processing circuit may be a processor and a memory that execute a program stored in the memory, or may be dedicated hardware.

Figure 6:
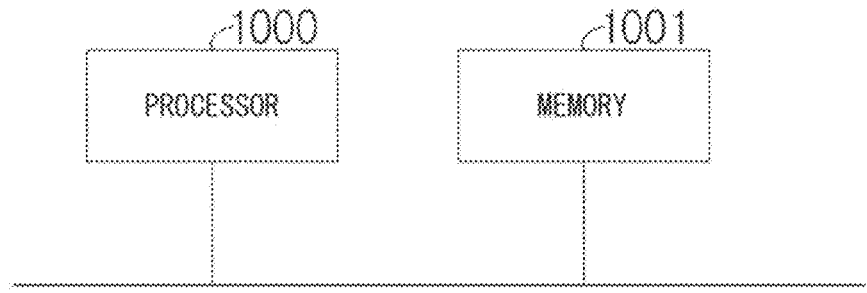
FIG. 6 is a diagram illustrating a case where a processing circuit included in the obstacle monitoring apparatus is configured by a processor and a memory.

FIG. 6 is a diagram illustrating an example in which a processing circuit included in the obstacle monitoring apparatus 2 is configured by a processor and a memory. When the processing circuit includes the processor 1000 and the memory 1001, the functions of the processing circuit of the obstacle monitoring apparatus 2 are implemented by software, firmware, or a combination of software and firmware. The software or firmware is written as a program and stored in the memory 1001. In the processing circuit, each function is implemented by the processor 1000 reading and executing a program stored in the memory 1001. That is, the processing circuit includes the memory 1001 configured to store a program in which processing of the obstacle monitoring apparatus 2 is to be executed. These programs can also be said to cause a computer to execute the procedures and methods for the obstacle monitoring apparatus 2.

Herein, the processor 1000 may be a central processing unit (CPU), a processing apparatus, an arithmetic apparatus, a microprocessor, a microcomputer, a digital signal processor (DSP), or the like. The memory 1001 includes, for example, a non-volatile or volatile semiconductor memory such as a random access memory (RAM), a read only memory (ROM), a flash memory, an erasable programmable ROM (EPROM), or an electrically EPROM (EEPROM) (registered trademark), a magnetic disk, a flexible disk, an optical disk, a compact disk, a mini disk, or a digital versatile disc (DVD).

Figure 7:
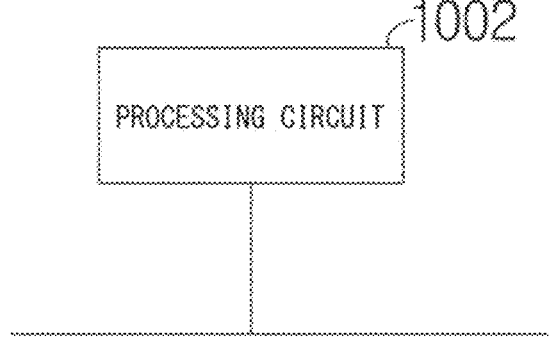
FIG. 7 is a diagram illustrating a case where the processing circuit included in the obstacle monitoring apparatus is configured by dedicated hardware.

FIG. 7 is a diagram illustrating an example of a case where a processing circuit included in the obstacle monitoring apparatus 2 is configured by dedicated hardware. When the processing circuit is configured by dedicated hardware, the processing circuit 1002 illustrated in FIG. 7 is, for example, a single circuit, a composite circuit, a programmed processor, a parallel programmed processor, an application specific integrated circuit (ASIC), a field programmable gate array (FPGA), or a combination thereof. Each function of the obstacle monitoring apparatus 2 may be implemented by the processing circuit 1002 separately for each function, or each function may be implemented collectively by the processing circuit 1002.

Note that some of the functions of the obstacle monitoring apparatus 2 may be implemented by dedicated hardware, and some of the functions may be implemented by software or firmware. In this manner, the processing circuit may implement the above-described functions by dedicated hardware, software, firmware, or a combination thereof.

Although the present disclosure has been described with reference to the example embodiments, the present disclosure is not limited to the above-described example embodiments. Various changes that can be understood by a person skilled in the art within the scope of the present disclosure can be made to the configuration and details of the present disclosure.

Each of the drawings or figures is merely an example to illustrate one or more example embodiments. Each figure may not be associated with only one particular example embodiment, but may be associated with one or more other example embodiments. As those of ordinary skill in the art will understand, various features or steps described with reference to any one of the figures can be combined with features or steps illustrated in one or more other figures, for example, to produce example embodiments that are not explicitly illustrated or described. Not all of the features or steps illustrated in any one of the figures to describe an example embodiment are necessarily essential, and some features or steps may be omitted. The order of the steps described in any of the figures may be changed as appropriate.

An example advantage according to the present disclosure is that, when detecting an obstacle in the heading direction of a moving body, based on a sensing result of a sensing means mounted on the moving body, it is possible to improve the detection accuracy for the obstacle while securing the moving speed of the moving body.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

The whole or part of the example embodiments disclosed above can be described as, but not limited to, the following supplementary notes.

Supplementary Note 1

An obstacle monitoring system including:

a sensing means for sensing an area ahead in a moving direction of a moving body;

a first obstacle detection means for detecting an obstacle, based on a sensing result of the sensing means; and a control means for selectively executing a plurality of control modes including a first control mode in which a moving speed of the moving body is a first moving speed and a sensing field of view of the sensing means is a first field of view, and a second control mode in which a moving speed of the moving body is a second moving speed being lower than the first moving speed and a sensing field of view of the sensing means is a second field of view being narrower than the first field of view, wherein, when the first obstacle detection means detects the obstacle while the control means is executing the first control mode, the control means executes the second control mode in such a way as to capture the obstacle within the second field of view.

Supplementary Note 2

The obstacle monitoring system according to supplementary note 1, further including a second obstacle detection means, configured by a trained neural network, for, when the control means is executing the second control mode, inputting a sensing result of the sensing means and outputting a detection score for each class of the obstacle being detected by the first obstacle detection means.

Supplementary Note 3

The obstacle monitoring system according to supplementary note 2, wherein a score threshold value is set for each class, and, when the detection score exceeds the score threshold value in any of the classes, the control means decelerates or stops the moving body.

Supplementary Note 4

The obstacle monitoring system according to supplementary note 3, wherein a first score threshold value is set as the score threshold value for a class in which movement of the moving body is hindered, and a second score threshold value being higher than the first score threshold value is set as the score threshold value for a class in which movement of the moving body is not hindered.

Supplementary Note 5

The obstacle monitoring system according to supplementary note 3 or 4, wherein, in each class, a score threshold value in a case of a bad weather is set lower than a score threshold value in a case of a good weather.

Supplementary Note 6

The obstacle monitoring system according to supplementary note 3 or 4, wherein, in each class, a score threshold value when a movement track on which the moving body is currently moving is a curved line is set lower than a score threshold value when the movement track is a straight line.

Supplementary Note 7

The obstacle monitoring system according to supplementary note 1, wherein the control means does not switch the control mode when the obstacle detected by the first obstacle detection means is off of a movement track of the moving body.

Supplementary Note 8

An obstacle monitoring apparatus including:

a sensing means for sensing an area ahead in a moving direction of a moving body;

a first obstacle detection means for detecting an obstacle, based on a sensing result of the sensing means; and a control means for selectively executing a plurality of control modes including a first control mode in which a moving speed of the moving body is a first moving speed and a sensing field of view of the sensing means is a first field of view, and a second control mode in which a moving speed of the moving body is a second moving speed being lower than the first moving speed and a sensing field of view of the sensing means is a second field of view being narrower than the first field of view, wherein, when the first obstacle detection means detects the obstacle while the control means is executing the first control mode, the control means executes the second control mode in such a way as to capture the obstacle within the second field of view.

Supplementary Note 9

An obstacle monitoring method including, by a computer:

detecting an obstacle, based on a sensing result of a sensing means for sensing an area ahead in a moving direction of a moving body;

selectively executing a plurality of control modes including a first control mode in which a moving speed of the moving body is a first moving speed and a sensing field of view of the sensing means is a first field of view, and a second control mode in which a moving speed of the moving body is a second moving speed being lower than the first moving speed and a sensing field of view of the sensing means is a second field of view being narrower than the first field of view; and executing the second control mode in such a way as to capture the obstacle within the second field of view, when the obstacle is detected while the first control mode is being executed.

Supplementary Note 10

A program causing a computer to execute the obstacle monitoring method according to supplementary note 9.

Some or all of the elements (e.g., configurations and functions) described in supplementary notes 2 to 7 depending on supplementary note 1 may be dependent on supplementary notes 8, 9, and 10 according to the same dependencies as supplementary notes 2 to 7. Some or all of the elements described in any supplementary note may be applied to various hardware, software, recording means for recording software, systems, and methods.

What is claimed is:

1. An obstacle monitoring system comprising at least one memory storing computer-executable instructions, and at least one processor configured to access the at least one memory and execute the computer-executable instructions to:

detect an obstacle, based on a sensing result from sensing means for sensing an area ahead in a moving direction of a moving body;

selectively execute a plurality of control modes including a first control mode in which a moving speed of the moving body is a first moving speed and a sensing field of view of the sensing means is a first field of view, and a second control mode in which a moving speed of the moving body is a second moving speed being lower than the first moving speed and a sensing field of view of the sensing means is a second field of view being narrower than the first field of view; and execute the second control mode in such a way as to capture the obstacle within the second field of view, when the obstacle is detected while the first control mode is being executed.

2. The obstacle monitoring system according to claim 1, wherein the at least one processor is further configured to execute the instructions to, when the second control mode is being executed, provide a sensing result of the sensing means to a trained neural network, and obtain a detection score for each class of the detected obstacle from the trained neural network.

3. The obstacle monitoring system according to claim 2, wherein a score threshold value is set for each class, and, the at least one processor is further configured to execute the instructions to, when the detection score exceeds the score threshold value in any of the classes, decelerate or stop the moving body.

4. The obstacle monitoring system according to claim 3, wherein a first score threshold value is set as the score threshold value for a class in which movement of the moving body is hindered, and a second score threshold value being higher than the first score threshold value is set as the score threshold value for a class in which movement of the moving body is not hindered.

5. The obstacle monitoring system according to claim 3, wherein, in each class, a score threshold value in a case of a bad weather is set lower than a score threshold value in a case of a good weather.

6. The obstacle monitoring system according to claim 3, wherein, in each class, a score threshold value when a movement track on which the moving body is currently moving is a curved line is set lower than a score threshold value when the movement track is a straight line.

7. The obstacle monitoring system according to claim 1, wherein the control mode is not switched when the detected obstacle is off of a movement track of the moving body.

8. An obstacle monitoring apparatus comprising at least one memory storing computer-executable instructions, and at least one processor configured to access the at least one memory and execute the computer-executable instructions to:

perform sensing of an area ahead in a moving direction of a moving body;

detect an obstacle, based on a sensing result;

selectively execute a plurality of control modes including a first control mode in which a moving speed of the moving body is a first moving speed and a sensing field of view is a first field of view, and a second control mode in which a moving speed of the moving body is a second moving speed being lower than the first moving speed and a sensing field of view of the sensing means is a second field of view being narrower than the first field of view; and execute the second control mode in such a way as to capture the obstacle within the second field of view, when the obstacle is detected while the control means is executing the first control mode.

9. An obstacle monitoring method comprising, by a computer:

detecting an obstacle, based on a sensing result of sensing means for sensing an area ahead in a moving direction of a moving body;

selectively executing a plurality of control modes including a first control mode in which a moving speed of the moving body is a first moving speed and a sensing field of view of the sensing means is a first field of view, and a second control mode in which a moving speed of the moving body is a second moving speed being lower than the first moving speed and a sensing field of view of the sensing means is a second field of view being narrower than the first field of view; and executing the second control mode in such a way as to capture the obstacle within the second field of view, when the obstacle is detected while the first control mode is being executed.

10. A non-transitory computer readable medium storing a program causing a computer to execute the obstacle monitoring method according to claim 9.

* * * * *